Figure 1:
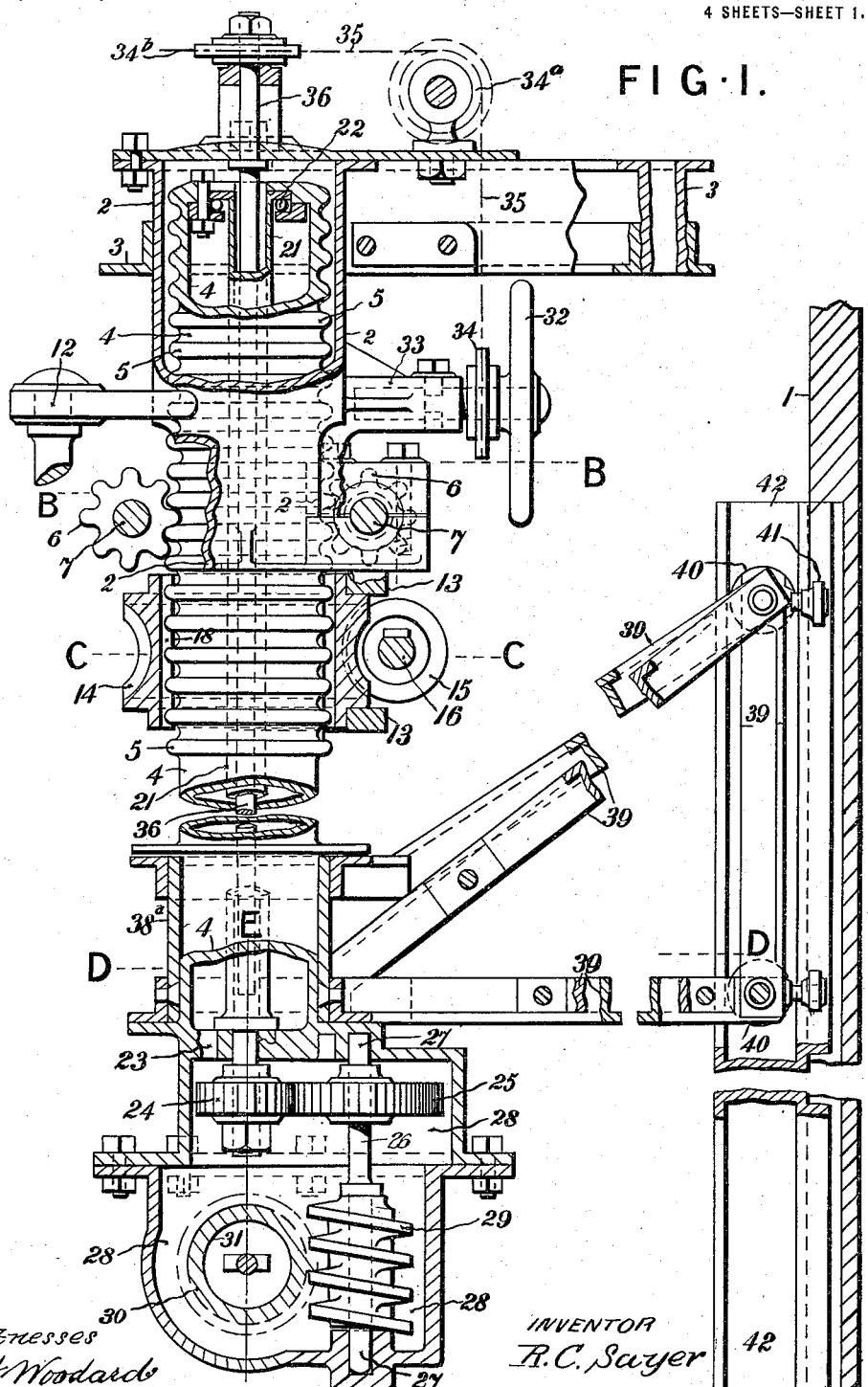

R. C. SAYER.
VEHICLE PROPELLER ACTUATING MECHANISM.
APPLICATION FILED AUG. 14, 1912.

1,156,712.

Patented Oct. 12, 1915.
4 SHEETS—SHEET 2.

Witnesses
A. Van Loock

Inventor
R. C. Sayer

Attorneys

R. C. SAYER.
VEHICLE PROPELLER ACTUATING MECHANISM.
APPLICATION FILED AUG. 14, 1912.
1,156,712.
Patented Oct. 12, 1915.
4 SHEETS—SHEET 3.
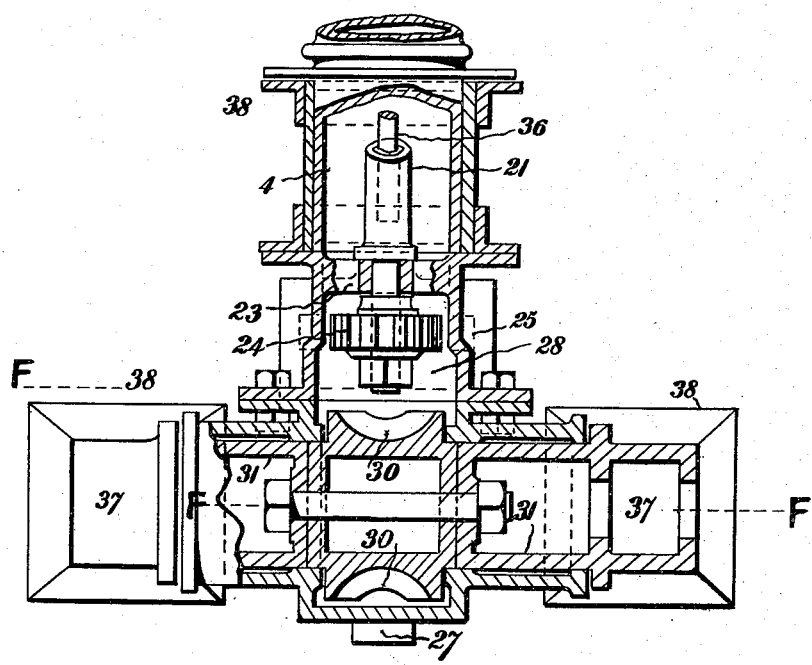
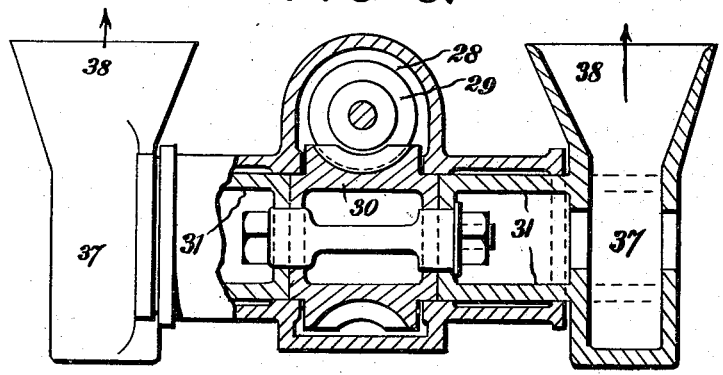

R. C. SAYER.
VEHICLE PROPELLER ACTUATING MECHANISM.
APPLICATION FILED AUG. 14, 1912.
1,156,712.
Patented Oct. 12, 1915.
4 SHEETS—SHEET 4.
FIG·7.
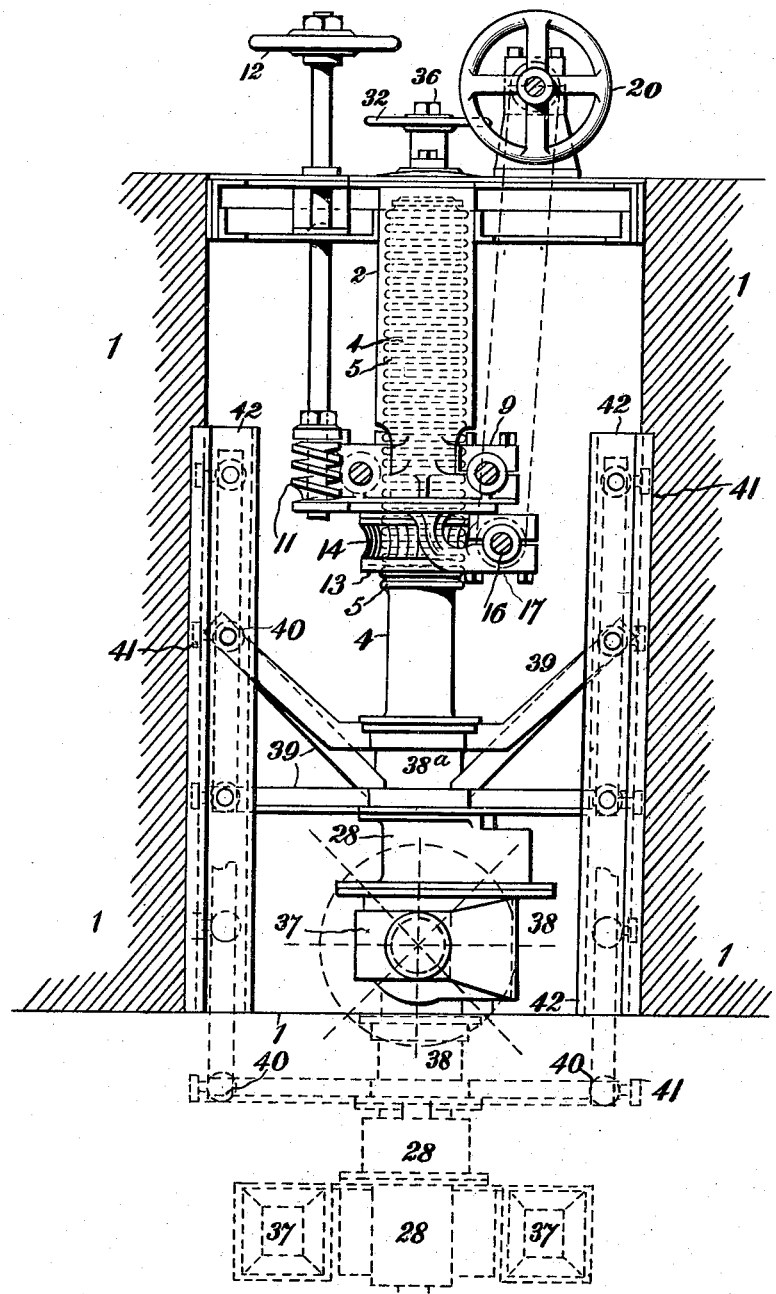

UNITED STATES PATENT OFFICE.

ROBERT COOKE SAYER, OF REDLAND, BRISTOL, ENGLAND.

VEHICLE PROPELLER-ACTUATING MECHANISM.

1,156,712.  Specification of Letters Patent.  Patented Oct. 12, 1915.

Application filed August 14, 1912. Serial No. 715,090.

*To all whom it may concern:*

Be it known that I, ROBERT COOKE SAYER, subject of the King of Great Britain and Ireland, residing at 11 Clyde road, Redland, Bristol, England, have invented certain new and useful Improvements in Vehicle Propeller-Actuating Mechanism, of which the following is a specification.

This invention relates to propeller actuating mechanism more particularly intended for use in connection with aerial and marine propulsion, and has for its object to enable propellers to be employed for driving and steering at any angle, also to enable the propellers to be adjusted vertically to varying heights relatively to the body vessel or vehicle driven thereby so that in the case of a body or vessel traveling on water the head of pressure of deep water may be utilized to increase the efficiency of the propellers.

With the above objects in view the invention comprises broadly a hanging bearing member, a propeller mounted to rotate in the lower end of the bearing member, a vertical guide for the bearing member, means for moving the bearing member vertically upward and downward in the guide, means for rotating the propeller about a horizontal axis and means for rotating the bearing member about a vertical axis.

In a practical form of the invention, the vertical guide aforesaid consists of a tubular member which is preferably fixed vertically upon the body or vehicle and the hanging bearing member comprises a hollow shaft or tube mounted to slide telescopically in the tubular guide member and provided externally with annular teeth. One or more pinions mesh with the annular teeth on the hanging bearing member and are carried on shafts supported on bearings on the guide member, one of which shafts also carries a worm wheel in gear with a worm spindle or shaft adapted to be operated by hand to raise, or lower, or rigidly hold the adjustable hanging bearing member and its attachments at varying vertical heights.

A worm wheel mounted to rotate between bearings on the lower end of the fixed guide tube surrounds the hanging bearing member and has an internal vertical key or keys, of a length to span two or more of the annular teeth of the said member and of sufficient radial projection to pass into notches in the annular teeth; so that a worm carried on a shaft in bearings on the fixed tubular guide when turned by a handle, will turn the worm wheel and its keys, and thus rotate the hanging bearing member and its attachments about a vertical axis. When actuated vertically, the bearing member slides freely in the worm wheel which surrounds it, the worm wheel being prevented from moving endwise by the bearings between which it is mounted.

When the hanging bearing member is rotated the propeller is carried around with it, and in order to impart a further rotary motion to the propeller about its own axis, a telescopic shaft is mounted to rotate in the hanging bearing member through which it extends from the upper to the lower end thereof and is geared with the propeller shaft through spur and worm gear, suitable gear being also provided for actuating the said telescopic shaft.

Figure 2:
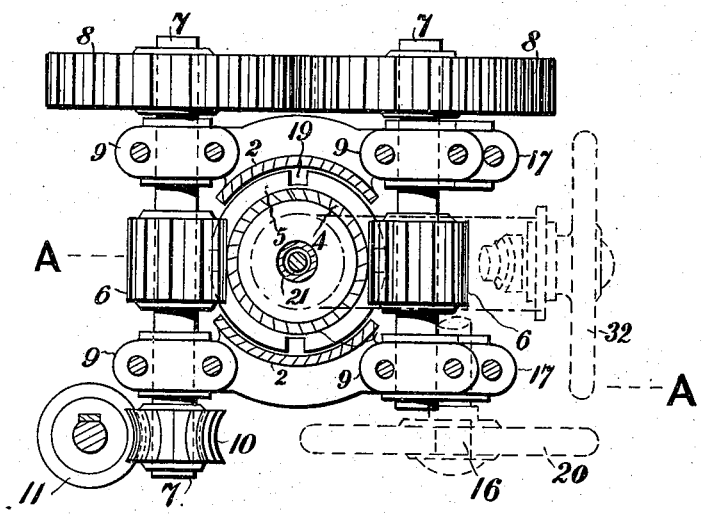
Figure 3:
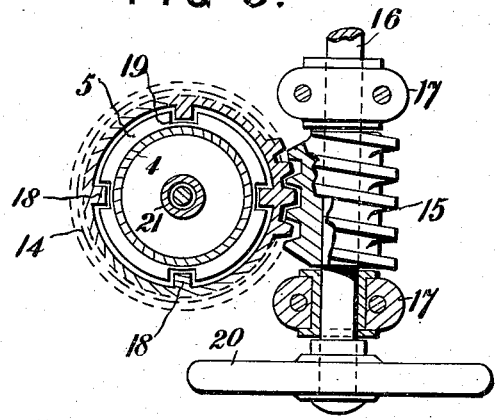
Figure 4:
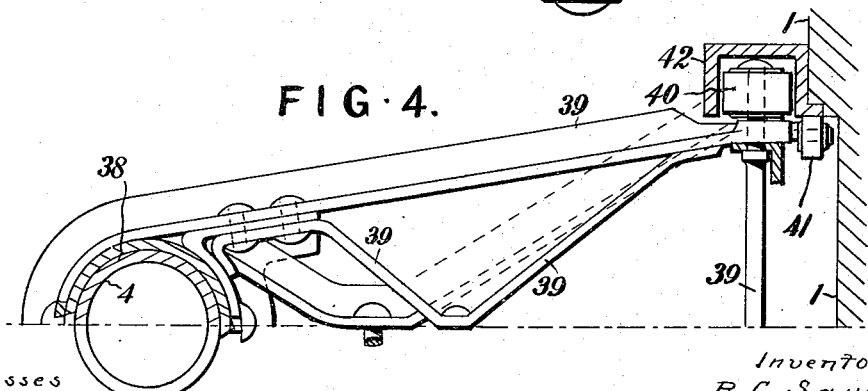

The invention is hereinafter more fully described with reference to the accompanying drawings in which, Figure 1 is a sectional elevation through the vertical shafts and guides taken at A—A Fig. 2; Fig. 2 is a transverse section taken at B—B Fig. 1; Fig. 3 is a section taken at C—C Fig. 1; Fig. 4 is a half sectional plan of the slide guide when fixed on a side or end of a vehicle, taken at D—D Fig. 1; Fig. 5 is a section on line E—E of Fig. 1; Fig. 6 is a section taken at F—F Fig. 5; Fig. 7 is a sectional elevation of the shafts in a well of the vehicle, with the handles on top; the propellers within the vehicle, and below it at right angles shown dotted.

As shown the fixed tubular guide member 2 is suspended vertically from the floor or girders 3 of the vehicle or the body 1 which is to be propelled.

The hollow shaft or tube 4 with annular teeth 5 which forms part of the hanging bearing member of the propeller telescopes with sliding contact within the tubular guide 2 being actuated vertically through pinions 6 which mesh with the teeth 5 and are mounted on parallel shafts 7 supported in bearings 9 on the tubular guide 2. The shafts 7 are geared together by spur gear wheels 8 which mesh with each other and are actuated by a worm wheel 10 on one of the shafts meshing with a worm 11 controlled by a handle 12. The tubular guide 2 has bearings 13 arranged to support and position a worm wheel 14 in gear with a worm 15 on a shaft 16 mounted in bearings 17 on the tubular guide 2. The wheel 14 has keys 18 adapted to slide in notches 19 in the teeth 5 of the shaft 4, so that when a hand wheel 20 and the worm 15 are turned the wheel 14 meshing with said worm 15 and the keys 18 are also turned thereby turning the tube 4 about its axis. Mounted in the tube 4 and co-axially therewith is a telescopic shaft consisting of a hollow shaft 21 and a solid shaft 36 capable of sliding inside same but prevented from rotating independently by a suitable key and groove connection.

The hollow shaft 21 is supported on a ball bearing 22 at its upper end and is guided at its lower end by a horizontal wall 23 through which it passes. A pinion 24 fixed on the lower end of the shaft 21 meshes with a spur wheel 25 on a shaft 26 mounted in bearings 27 in a casing 28 secured to the tube 4. The shaft 26 carries a worm 29 which meshes with and rotates a worm wheel 30 fixed to a horizontal shaft 31 on which are fixed the propellers to receive like motion at any angle when actuated by a hand wheel 32 on a shaft mounted in bearings 33 on the fixed guide member 2. A sprocket gear or pinion 34 is fixed to the hand wheel shaft and a sprocket chain 35 passes over said gear 34, sheaves 34$^a$ on the floor 3 and a gear 34$^b$ fixed to the shaft 36 passing down within and keyed to the tubular part 21 of the telescopic shaft and whereby the propellers receive rotary motion about their axes. The propellers shown are of the type in which propulsion is effected by the reaction of explosions and are represented by chambers 37 on each side of the shaft 4, (see Figs. 5 and 6), in which gases are exploded, and flared outlets 38 from which the gases escape to act on the medium, traversed by the body or vehicle, either water or air.

Fig. 7 also shows means for supporting or staying the hanging bearing member in a well in the vehicle 1, said support consisting of a sleeve or collar 38$^a$ embracing the hanging bearing member and a frame 39 connected to the collar 38$^a$ at one end and provided at the other end with friction wheels 40, 41 that run in fixed guide members 42 upon the vehicle, so that the stay frame partakes of the movement of the hanging bearing tube 4 when this tube is adjusted vertically as hereinbefore described. Space is provided for the propellers in all positions to free every obstruction as shown enlarged by Fig. 1.

When it is desired to drive the vehicle 1 by screw propellers a pair of telescopic shafts such as 21, 36 are driven by a suitable motor and geared by bevel gearing with the propeller shafts.

Instead of explosion or screw propellers other propellers of the type which rotate in the direction of driving may be employed, these propellers being geared in any suitable manner to a telescopic driving shaft or shafts as described.

I claim as my invention:—

1. The combination with a body, vehicle or the like of propelling and steering apparatus comprising a tubular guide member fixed vertically on the body or vehicle, a hanging bearing member comprising a tube mounted to slide telescopically in the tubular guide and provided with annular teeth, pinions mounted on the fixed tubular guide and meshing with the teeth on the bearing member, means for actuating the pinions to raise and lower the bearing member in the guide member, means for rotating the toothed bearing member about a vertical axis, a casing on the lower end of the toothed bearing member, a pinion and gear in said casing, a horizontal shaft extending on each side of said toothed tube bearing member and actuated by said pinion and gear, propellers fixed on said shaft, a telescopic shaft within the bearing member and geared to said horizontal shaft and means to turn said shaft and the propellers about their axes.

2. The combination with a body, vehicle or the like of propelling and steering apparatus comprising a tubular guide member fixed vertically on the body or vehicle, a hanging bearing member comprising a tube mounted to slide telescopically in the tubular guide and provided with annular teeth, pinions mounted on the fixed tubular guide and meshing with the teeth on the bearing member, means for actuating the pinions to raise and lower the bearing member in the guide member, a worm wheel mounted concentric to the toothed tube of the bearing member, a sliding key and groove connection between the worm wheel and toothed tube, means to rotate both about a vertical axis, propelling means mounted to rotate in the lower end of the bearing member and means extending through the bearing member for rotating the propelling means about a horizontal axis, substantially as described.

In testimony whereof I have affixed my signature, in presence of two witnesses.

ROBERT COOKE SAYER.

Witnesses:
E. J. BUSSELL,
E. TYLER.